United States Patent [19]

Hirano et al.

[11] Patent Number: 5,142,330
[45] Date of Patent: Aug. 25, 1992

[54] DEVELOPMENT UNIT HAVING A TONER LAYER THICKNESS REGULATION MEMBER

[75] Inventors: Yasuo Hirano; Jun Aoto, both of Numazu, Japan

[73] Assignee: Ricoh Company, Ltd., Tokyo, Japan

[21] Appl. No.: 643,333

[22] Filed: Jan. 22, 1991

[30] Foreign Application Priority Data

Jan. 22, 1990 [JP] Japan .................. 2-10749

[51] Int. Cl.⁵ .......................................... G03G 15/08
[52] U.S. Cl. ................................. 355/259; 118/656; 355/245; 355/251; 428/447; 430/120
[58] Field of Search ............... 355/245, 251, 253, 259, 355/260; 118/656, 657, 658; 430/120, 122, 110; 428/447, 450

[56] References Cited

U.S. PATENT DOCUMENTS

| | | |
|---|---|---|
| 3,942,474 | 3/1976 | Smith et al. ............... 118/637 |
| 3,969,308 | 7/1976 | Penneck ..................... 260/37 SB |
| 4,423,132 | 12/1983 | Kondo et al. ............... 430/67 |
| 4,760,422 | 7/1988 | Seimiya et al. ............. 118/656 X |
| 4,833,058 | 5/1989 | Hirano et al. .............. 430/120 |
| 4,948,845 | 8/1990 | Gagnon et al. ............. 525/409 |
| 4,958,197 | 9/1990 | Kinashi et al. ............. 355/299 |

Primary Examiner—A. T. Grimley
Assistant Examiner—Thu Dang
Attorney, Agent, or Firm—Oblon, Spivak, McClelland, Maier & Neustadt

[57] ABSTRACT

A development unit comprising a development roller for developing a latent electrostatic image formed on an electrophotographic photoconductor to a visible toner image by applying a non-magnetic one-component type toner thereto, and a toner layer thickness regulation member for forming a toner layer on the above development roller, which toner layer thickness regulation member comprises at least (a) a rubber-like fluorosilicone polymer including repeat units of formula (I), (b) a silicone polymer comprising a copolymer of dimethyl silicone and methyl vinyl silicone with a crosslinking density of $4 \times 10^{-4}$ to $8 \times 10^{-4}$ mol/cc, and (c) an alkylene-oxide-addition type fluorine-containing surface active agent:

$$-(\underset{\underset{CH_3}{|}}{\overset{\overset{CH_2-CH_2-CF_3}{|}}{Si}}-O)_n- \qquad (I)$$

wherein n is 1,000 to 600,000.

14 Claims, 2 Drawing Sheets

DEVELOPMENT UNIT HAVING A TONER LAYER THICKNESS REGULATION MEMBER

BACKGROUND OF THE INVENTION

1. Field of the Invention

The present invention relates to a development unit for developing latent electrostatic images to visible toner images, and more particularly to a development unit in which a toner is supplied onto a development roller and formed into a thin layer by toner layer thickness regulation means.

2. Discussion of the Background

Conventionally, there is known a method of developing latent electrostatic images by a non-magnetic one-component toner. According to this method, the toner is supplied onto a development roller and formed into a thin layer by toner layer thickness regulation means such as a blade- or roller-shaped member, and the thus formed toner layer is then brought into contact with a latent electrostatic image formed on an electrophotographic photoconductor, whereby the latent electrostatic image is developed to a visible toner image.

In the aforementioned development method, the toner layer thickness regulation member is required to have (i) good toner releasability by which toner is released from the toner layer thickness regulating member, (ii) high resistance to wear, and (iii) toner chargeability by which toner is charged to a desired polarity. With the above requirements taken into consideration, conventional toner layer thickness regulation members comprise a metal such as stainless steel, fluoroplastics, or modified fluoroplastics.

However, the toner releasability of the toner layer thickness regulation member which comprises a metal is so poor that the toner partially adheres to the surface of the toner layer thickness regulation member when the toner layer thickness regulation member is brought into contact with a thin toner layer formed on the development roller. As a result, streaks are formed on the toner thin layer on the development roller, which causes white lines in the developed solid images.

In the case where the toner layer thickness regulation member comprises a fluoroplastic, the wear-resistance thereof is considerably so poor that the life thereof is short, although the toner releasability is good. In addition, this kind of toner layer thickness regulation member itself tends to be charged to a negative polarity, so that it can easily charge the toner layer formed on the development roller to a positive polarity, but it is difficult to charge the toner layer to a negative polarity. Therefore, the above toner layer thickness regulation member cannot be used for both the negatively- and positively-chargeable toners.

When the toner layer thickness regulation member comprises a modified fluoroplastic, which is prepared, for instance, by modifying a fluoroplastic using polyethylene, the wear-resistance and the toner chargeability can be improved to some degree. However, the toner releasability is low, so that toner particles adhere to the surface of the toner layer thickness regulation member.

As disclosed in Japanese Laid-Open Patent Application 57-66442, a blade- or roller-shaped toner layer thickness regulation member comprises a silicone resin, modified silicone resin or silicone oil to control the toner chargeability. In such a triboelectric charging member, however, the wear-resistance and the toner releasability are degraded. In addition, the triboelectric charging member of this kind cannot be used in common with both the positively- and negatively-chargeable toners.

To solve the above-mentioned problems, the inventors of the present invention proposed to use a toner layer thickness regulation member comprising a particular dimethyl silicone rubber. In this case, the toner charging performance of the toner layer thickness regulation member mainly depends on the triboelectric performance of the toner layer regulation member, because the above-mentioned dimethyl silicone rubber is electrically insulating. Therefore, when this toner layer regulating member is used, the charge quantity of the toner varies depending on the kind of toner and the material for the development roller in the development unit. Furthermore, it takes a great deal of time and labor to find an appropriate combination of the toner and the material for the development roller in order to obtain the desired charge quantity of the toner.

As a method of freely controlling the charge quantity of toner, a so-called charge injection method is widely employed. In this case, electric charges are injected into the toner layer formed on a development roller by using a toner layer thickness regulation member comprising a material with a middle to high volume resistivity. For use in practice, finely-divided particles with low resistivity, such as carbon and metallic powder, are dispersed in the aforementioned dimethyl silicone rubber to decrease the volume resistivity of the toner layer thickness regulation member.

However, when the toner layer thickness regulation member shows a middle volume resistivity (from $10^6$ to $10^{12}$ $\Omega\cdot$cm), stable charge injection into the toner layer cannot be performed due to considerable variations in the volume resistivity of the regulation member. On the other hand, when the volume resistivity of the toner layer thickness regulation member is less than $10^6$ $\Omega\cdot$cm by dispersing therein a large quantity of finely-divided particles with low resistivity, it has the shortcoming that the toner releasability decreases.

SUMMARY OF THE INVENTION

Accordingly, an object of the present invention is to provide a development unit including a toner layer thickness regulation member for forming a thin toner layer on a development roller, which regulation member has excellent toner releasability and improved wear-resistance, and is capable of stably charging toner particles to a desired polarity by the electric charge injection method.

The above-mentioned object of the present invention can be achieved by a development unit including (i) a development roller for developing a latent electrostatic image formed on an electrophotographic photoconductor to a visible toner image by applying a non-magnetic one-component type toner thereto, and (ii) a toner layer thickness regulation member for forming a toner layer on the above-mentioned development roller, which regulation member comprises at least (a) a rubber-like fluorosilicone polymer including repeat units of formula (I), (b) a silicone polymer comprising a copolymer of dimethyl silicone and methyl vinyl silicone with a cross-linking density of $4\times10^{-4}$ to $8\times10^{-4}$ mol/cc, and (c) an alkylene-oxide-addition type fluorine-containing surface active agent.

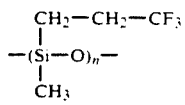

wherein n is 1,000 to 600,000.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
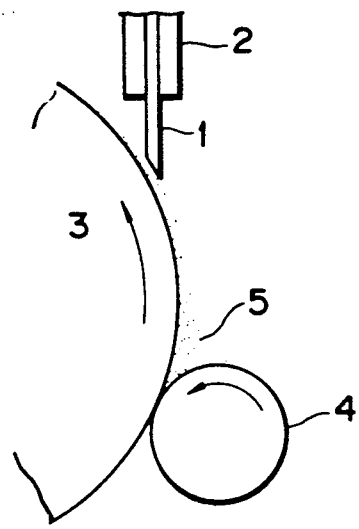
FIGS. 1 and 2 are schematic views of examples of a development unit according to the present invention.

The toner layer thickness regulation member for use in the present invention comprises a fluorosilicone polymer with repeat units of:

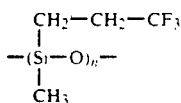

containing a trifluoropropyl group, which is highly resistant to heat and humidity. In addition, this fluorosilicone polymer has a small volume resistivity because of the polar effect of the trifluoropropyl group contained in the polymer, and has a high dielectric constant. Furthermore, the physical properties such as hardness and the electrical characteristics of the fluorosilicone polymer scarcely change even though the environmental conditions such as ambient temperature and humidity are changed. Namely, it has excellent environmental resistance.

In the above fluorosilicone polymer, it is preferable that the number of the repeat unit of SiO, that is, n in formula (I), be 10,000 to 500,000, and more preferably in the range of 100,000 to 500,000.

The aforementioned fluorosilicone polymer for use in the present invention is in various forms, for example, it is available as a liquid-type polymer and a millable-type polymer which can be kneaded in a two-roll mill. In the present invention, the millable-type fluorosilicone polymer is preferable because it is easy to knead with the silicon polymer comprising a copolymer of dimethyl silicone and methyl vinyl silicone (hereinafter referred to as the methyl vinyl silicone polymer).

When a fluorine-containing surface active agent is added to the above fluorosilicone polymer, the volume resistivity of the polymer decreases, which makes it possible to charge the toner by the electric charge injection method.

As the fluorine-containing surface active agent for use in the present invention, nonionic, anionic, cationic and amphoteric surface active agents can be employed as far as they comprise a fluorine-containing compound including a fluoroalkyl group. Particularly, nonionic surface active agents are preferable from the viewpoint of the environmental resistance.

Moreover, when an alkylene-oxide-addition type fluorine-containing surface active agent is used, the volume resistivity of the toner layer thickness regulation member can be easily decreased. In this case, as the moiety of the alkylene oxide, ethylene oxide is preferable, and moreover, the number of the repeat units of an ethylene group is preferably 3 to 15.

Examples of the commercially available products of the above-mentioned fluorine-containing surface active agents are "Surflon" (Trademark), made by Asahi Glass Co., Ltd.; "Megafac" (Trademark), made by Dainippon Ink & Chemicals, Incorporated; "Eftop" (Trademark), made by Tohkem Products Corporation; "Ftergent" (Trademark), made by NEOS Co., Ltd.; and "Unidyne" (Trademark), made by Daikin Industries, Ltd.

The content of the above fluorine-containing surface active agent in the formulation of the toner layer thickness regulation member is not specifically limited, but preferably in the range from 0.1 to 10 parts by weight to 100 parts by weight of the fluorosilicone polymer. More preferably, it is from 1 to 5 parts by weight to 100 parts by weight of the fluorosilicone polymer from the viewpoint of the electrical property contributing to the charge injection performance of the obtained toner layer thickness regulation member.

When the amount of the fluorine-containing surface active agent is within the above range, not only the volume resistivity of the toner layer thickness regulation member is efficiently decreased, but also the environmental resistance thereof can be sufficiently improved. Furthermore, the surface of the toner layer thickness regulation member does not become tacky and the surface active agent does not ooze to the surface of the toner layer thickness regulation member.

To incorporate the fluorine-containing surface active agent into the fluorosilicone polymer, any of the conventional methods can be used. For instance, a millable-type fluorosilicone rubber is mixed together with the fluorine-containing surface active agent in a two-roll mill or a Banbury type mixer; and a liquid type fluorosilicone rubber in a stirring machine such as a homogenizer.

The toner layer thickness regulation member also comprises the previously mentioned methyl vinyl silicone polymer. The above methyl vinyl silicone polymer has a methylvinyl siloxane unit, with the ease of crosslinking and the strength of the obtained rubber material taken into consideration. The crosslinking density of the above-mentioned methyl vinyl silicone polymer can be easily controlled by changing the number of units of methylvinyl siloxane therein. The crosslinking density of the methyl vinyl silicone polymer for use in the present invention can be measured in accordance with the methods as described in R. B. PRIME, Thermochimica Acta 26, (1978), 166-174; "Development of Application of Silicone Rubber"; and "Polymer Digest, 1980, 8, 59-60".

Specifically, a sample (5 mm × 20 mm) is cut from a rubber sheet of methyl vinyl silicone polymer with a thickness of 2 mm, which has been vulcanized and molded. This sample is immersed into 50 ml of toluene at room temperature. The weight of the rubber sample impregnated with the toluene is measured at appropriate intervals. When the difference between two measurement values, the latter of which is obtained 24 hours after the measurement of the former, reaches 1% or less, the rubber sample is taken out from the toluene, and the weight thereof is measured and expressed by W(g). This rubber sample is then air-dried, followed by drying at 120° C. for 3 hours to remove the toluene component therefrom. The weight of the rubber sample after drying is expressed by $W_o(g)$. Sequentially, the rubber sample is placed on a platinum boat and heated up to 900° C. in a stream of nitrogen with the temperature increased at a rate of 10° C./min or less. After the temperature is maintained at 900° C. for 10 minutes, the rubber sample is cooled to room temperature and the weight of the sample is measured. This value is expressed by $W_t(g)$.

The crosslinking density, No/Vo mol/cc, of a vulcanized rubber of methyl vinyl silicone polymer is calculated in accordance with the following formula, and the obtained value is referred to as the crosslinking density.

$$No/Vo = \frac{-\ln(1 - V_2) + V_2 + 0.465 V_2^2}{106.27 \times (V_2^{\frac{1}{3}} - V_2/2)}$$

wherein $$V_2 = \frac{[(W_o' - W_f')/W_o]/0.98}{[(W_o' - W_f')/W_o]/0.98 + [(W' - W_o')/W_o']/0.867}$$

It is preferable that the crosslinking density of the methyl vinyl silicone polymer for use in the toner layer thickness regulation member be in the range of $4 \times 10^{-4}$ to $8 \times 10^{-4}$ mol/cc, since the toner particles on the development roller scarcely adhere to the surface of the toner layer thickness regulation member, so that no streak appears on the toner layer formed on the development roller. In addition, the toner layer thickness regulation member can be worked without cracking, which enables the formation of a uniform toner thin layer on the development roller.

The toner layer thickness regulation member for use in the present invention comprises the previously mentioned fluorosilicone polymer, methyl vinyl silicone polymer and fluorine-containing surface active agent. It is preferable that the amount of the methyl vinyl silicone polymer be in the range of 10 to 1,000 parts by weight, and more preferably in the range of 10 to 100 parts by weight, to 100 parts by weight of the fluorosilicone polymer. When the amount balance between the methyl vinyl silicone polymer and the fluorosilicone polymer is within the above range, the volume resistivity of the obtained toner layer thickness regulation member is sufficiently decreased by addition of the fluorine-containing surface active agent, and the toner releasability of the regulation member does not decrease.

The toner layer thickness regulation member for use in the present invention may further comprise an inorganic filler, particularly in order to adjust the mechanical strength thereof according to the configuration of the regulation member.

Examples of the above inorganic filler for use in the present invention are dry silica, wet silica, diatomaceous earth, ground quartz, titanium oxide and talc. Of these, dry silica is most preferable from the viewpoint of the environmental stability of the volume resistivity of the toner layer thickness regulation member.

Figure 2:
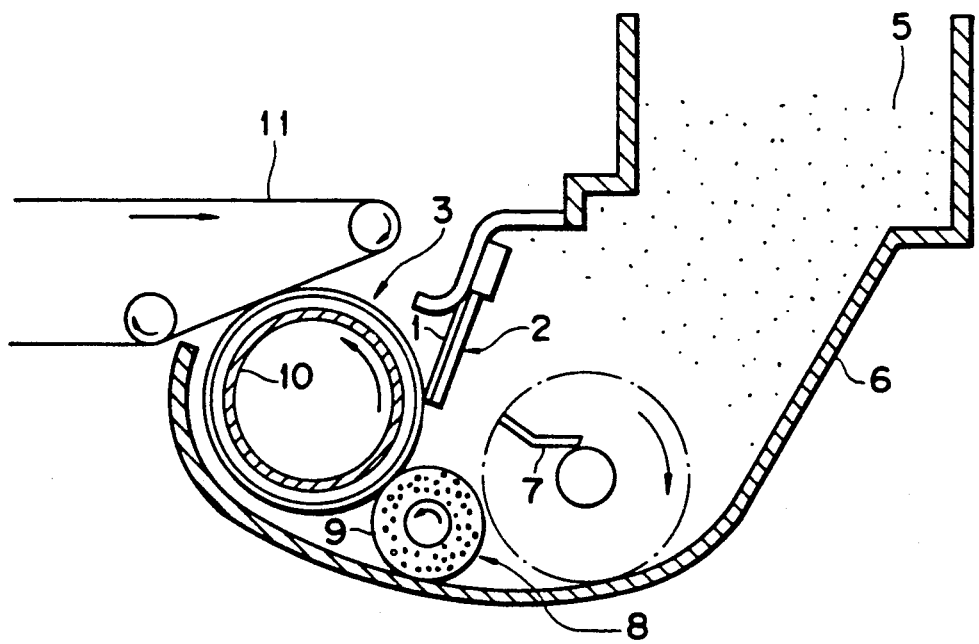

FIG. 1 and FIG. 2 are schematic views of the representative examples of the development unit according to the present invention.

In FIG. 1, a non-magnetic one-component type toner 5 is transported onto a developer supply roller 4 and then onto the surface of a development roller 3. The toner 5 is spread on the development roller 3 by means of a toner layer thickness regulation member 1 which is supported by a holder 2. A thin toner layer with a predetermined thickness is formed on the development roller 3 as the development roller 3 is rotated in the direction of the arrow.

In FIG. 2, a non-magnetic one-component type toner 5 is held in a development unit 6 and supplied therefrom to a toner supply sponge roller 8 with stirring by a toner stirring blade 7. The toner 5 is then transported to a development roller 3 and spread thereon by means of a toner layer thickness regulation member 1 which is supported by a holder 2, so that a thin layer of the toner is formed on the development roller 3 as the development roller 3 is rotated in the direction of the arrow. The toner layer formed on the development roller 3 is brought into contact with a surface of a belt-shaped electrophotographic photoconductor 11 to develop latent electrostatic images formed thereon to visible toner images. In FIG. 2, reference numeral 9 indicates a sponge cell; and reference numeral 10, a core of the development roller 3.

The toner layer thickness regulation member shown in FIG. 1 is constructed in such a fashion that an end portion projects over the holder 2. On the other hand, in FIG. 2, the back surface of the toner layer regulation member is entirely supported by the holder 2. Due to such a difference in the configuration, the mechanical strength of the toner layer thickness regulation member in FIG. 1 is required to be greater than that shown in FIG. 2. A larger amount of the inorganic filler may be contained in the composition of the toner layer thickness regulation member of FIG. 1. Depending on the configuration of the toner layer thickness regulation member, the content of the inorganic filler may appropriately be controlled.

In order to inject the electric charges into the toner layer formed on the development roller, the toner layer thickness regulation member for use in the present invention is provided on an electroconductive holder as shown in FIGS. 1 and 2.

Examples of the material for the aforementioned electroconductive holder are metals such as SUS, aluminum, iron, copper and steel; electroconductive plastics; and insulating resins which have been treated to be electroconductive by coating the surface thereof with an electroconductive coating compound.

To form the toner layer thickness regulation member on the holder, the toner layer thickness regulation member is worked into a sheet by the conventional methods such as press molding, and laminated on the electroconductive holder with an electroconductive adhesive, followed by the final molding to obtain a predetermined shape. Alternatively, an electroconductive holder which has been coated with an electroconductive primer and a toner layer thickness regulation member may be subjected to one-piece molding.

In terms of the efficiency of the electric charge injection method, it is preferable that the development roller of the development unit according to the present invention have a surface layer with a volume resistivity of less than $10^{13}$ Ω·cm.

FIGS. 3(a) to 3(d) are schematic cross-sectional views of examples of the development roller for use in the present invention.

Figure 3:
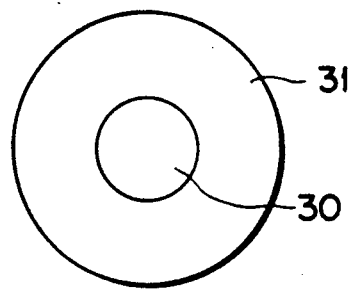
FIGS. 3(a) to 3(d) are schematic cross-sectional views of examples of a development roller for use in the present invention.
Figure 3:
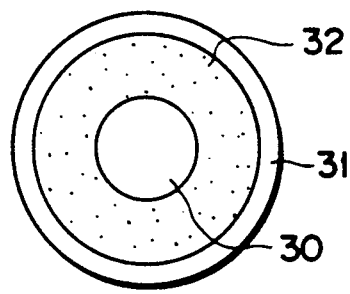
Figure 3:
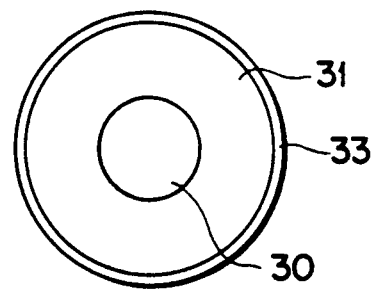
Figure 3:
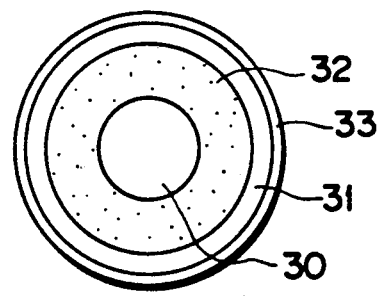

In FIG. 3(a), a development roller is composed of a core member 30 and a surface layer 31 formed thereon. The development roller of this kind can be prepared by conventional methods, for example, press molding, extrusion, steam molding, injection molding and cast molding.

The insulating rubber materials such as nitrile-butadiene rubber, epichlorohydrin rubber, urethane rubber, acrylic rubber, chloroprene rubber, polyamide, silicone rubber and ethylene-propylene rubber in which electroconductive particles with a low volume resistivity such as metal powder and carbon black are dispersed are preferably used as the material for the surface layer 31 of the development roller as shown in FIG. 3(a).

In FIG. 3(b), a development roller is constructed in such a manner that an electroconductive layer 32 and a surface layer 31 are successively formed on the core member 30. For the electroconductive layer 32, materials with a volume resistivity of $10^7$ $\Omega$·cm or less are usable.

In the development roller as shown in FIG. 3(c), an outer layer 33 is further provided on the surface layer 31 of the development roller of FIG. 3(a). The development roller as shown in FIG. 3(d) can be prepared by further providing an outer layer 33 on the surface layer 31 of the development roller of FIG. 3(b).

In such cases, the outer layer 33 is required to have a volume resistivity of $10^{12}$ $\Omega$·cm or less. Examples of the material for the outer layer 33 of the development rollers in FIGS. 3(c) and 3(d) include vinyl resins such as polyvinyl chloride, polyvinyl butyral, polyvinyl alcohol, polyvinylidene chloride, polyvinyl acetate and polyvinyl formal; polystyrene resins such as polystyrene, styrene-acrylonitrile copolymer and acrylonitrile-butadiene-styrene copolymer; polyethylene resins such as polyethylene and ethylene-vinyl acetate copolymer; acrylic resins such as polymethyl methacrylate and polymethyl methacrylate-styrene copolymer; and other resins such as polyacetal, polyamide, cellulose, polycarbonate, phenoxy resin, polyester, fluoroplastic, polyurethane, phenolic resin, urea resin, melamine resin, epoxy resin, unsaturated polyester resin and silicone resin.

In the present invention, the shape of the toner layer thickness regulation member is not limited to a blade, but other shapes, such as a roller are applicable.

Other features of this invention will become apparent in the course of the following description of exemplary embodiments, which are given for illustration of the invention and are not intended to be limiting thereof.

EXAMPLE 1

Preparation of Toner Layer Thickness Regulation Blade

A mixture of the following components was cured at 170° C. for 10 minutes and formed into a sheet by the press molding with application thereto of a pressure of 120 kg/cm², so that a rubber sheet with a thickness of 1 mm was prepared.

|  | Parts by Weight |
|---|---|
| Fluorosilicone polymer containing a trifluoropropyl group | 200 |
| Polydimethylsiloxane (Crosslinking density: $5.2 \times 10^{-4}$ mol/cc) | 100 |
| Dry silica | 100 |
| Fluorine-containing surface active agent "DS.401" (Trademark), made by Daikin Industries, Ltd. | 5 |
| 2,5-dimethyl-2,5-di-tert-butyl peroxyhexane (Commercially available crosslinking agent "RC-4" Trademark), made by Toray Silicone Co., Ltd.) | 3 |

A commercially available electroconductive adhesive "SE5085EC" (Trademark), made by Toray Silicone Co., Ltd., was applied to the surface of a holder made of SUS with a thickness of 2 mm. The above-prepared rubber sheet was then applied to the surface of the holder which was coated with the adhesive in such a configuration that the rubber sheet projected over the holder by 4 mm, and the end portion of the rubber blade was positioned at an angle of 60° with respect to the surface of the development roller. Thus, a toner layer thickness regulation blade No. 1 as shown in FIG. 1 was prepared.

The thus prepared toner layer thickness regulation blade was incorporated in a development unit as shown in FIG. 1 together with the following components:

Development Roller

The development roller having a length of 220 mm and a diameter of 20 mm, with a structure as shown in FIG. 3(c).
Surface layer: Carbon-dispersed silicone rubber
Layer thickness, 6 mm
Rubber hardness, 32° (JIS A)
Volume resistivity, $8 \times 10^9$ $\Omega$·cm
Outer layer: Carbon-dispersed fluoroplastic
Material, "Lumifron LF601C" (Trademark) made by Asahi Glass Co., Ltd.
Layer thickness, 30 μm
Volume resistivity, $3 \times 10^{10}$ $\Omega$·cm

Developer Supply Roller

An electroconductive urethane sponge roller. Toner:
(a) Positively-chargeable toner with the following formulation.

|  | Parts by Weight |
|---|---|
| Styrene-acrylic resin | 100 |
| Nigrosine dye | 2 |
| Carbon black | 10 |

(b) Negatively-chargeable toner with the following formulation.

|  | Parts by Weight |
|---|---|
| Styrene-acrylic resin | 100 |
| Chromium-containing monoazo dye | 2 |
| Carbon black | 10 |

In the thus prepared development unit, a charge injection performance test was carried out, with the potential of the development roller made different from that of the toner layer thickness regulation blade. In this test, the electric charge quantity of the toner was measured by a blow-off method, with application of voltages to the development roller, the developer supply roller and the toner layer thickness regulation blade, as respectively set forth in Table 1.

TABLE 1

|  | (I) | (II) | (III) | (IV) |
|---|---|---|---|---|
| Development Roller | −430 (V) | −430 | −430 | −430 |
| Developer Supply Roller | −430 | −430 | −430 | −430 |
| Toner Layer Thickness Regulation Blade | −430 | −430 | −630 | −230 |

In the above Table 1, the positively-chargeable toner (a) was used in the cases of (I) and (IV). The negatively-chargeable toner (b) was used in the cases of (II) and (III).

In the above-mentioned charge injection performance test, the adhesion of toner particles to the toner layer thickness regulation blade was observed. The degree of adhesion of toner particles was evaluated in accordance with the following four grades.

1: No adhesion of toner particles to the toner layer thickness regulation blade was observed.
2: Toner particles slightly adhered to the toner layer thickness regulation blade.
3: The toner particles rather adhered to the toner layer thickness regulation blade, but they were easily wiped off with a cloth.
4: The toner particles adhering to the toner layer thickness regulation blade were in the fused state, so that they were not easily wiped off with a cloth.

The results of the test are given in Table 2.

EXAMPLE 2

Preparation of Toner Layer Thickness Regulation Blade

A mixture of the following components was cured at 170° C. for 10 minutes and formed into a sheet by press molding with application thereto of a pressure of 120 kg/cm$^2$, so that a rubber sheet with a thickness of 0.2 mm was prepared.

|  | Parts by Weight |
|---|---|
| Fluorosilicone polymer containing a trifluoropropyl group | 100 |
| Polydimethylsiloxane (Crosslinking density: 5.2 × 10$^{-4}$ mol/cc) | 100 |
| Dry silica | 100 |
| Fluorine-containing surface active agent "DS.401" (Trademark), made by Daikin Industries, Ltd. | 5 |
| 2,5-dimethyl-2,5-di-tert-butyl peroxyhexane (Commercially available crosslinking agent "RC-4" (Trademark), made by Toray Silicone Co., Ltd.) | 3 |

A commercially available electroconductive adhesive "SE5085EC" (Trademark), made by Toray Silicone Co., Ltd., was applied to the surface of a holder made of SUS with a thickness of 2 mm. The above-prepared rubber sheet was then applied to the surface of the holder as shown in FIG. 2. Thus, a toner layer thickness regulation blade No. 2 as shown in FIG. 2 was prepared.

The thus prepared toner layer thickness regulation blade was incorporated in the same development unit as employed in Example 1.

Using the development unit thus obtained, the same charge injection performance test as in Example 1 was carried out. The results are given in Table 2.

COMPARATIVE EXAMPLE 1

The procedure for preparation of the toner layer thickness regulation blade employed in Example 1 was repeated except that the polydimethylsiloxane with a crosslinking density of 5.2 × 10$^{-4}$ mol/cc used in Example 1 was replaced by polydimethylsiloxane with a crosslinking density of 1.0 × 10$^{-4}$ mol/cc, so that a comparative toner layer thickness regulation blade No. 1 as shown in FIG. 1 was prepared.

The thus prepared comparative toner layer thickness regulation blade was incorporated in the same development unit as employed in Example 1.

Using the development unit thus obtained, the same charge injection performance test as in Example 1 was carried out. The results are given in Table 2.

COMPARATIVE EXAMPLE 2

The procedure for preparation of the toner layer thickness regulation blade employed in Example 1 was repeated except that the fluorine-containing surface active agent in Example 1 was not used, so that a comparative toner layer thickness regulation blade No. 2 as shown in FIG. 1 was prepared.

The thus prepared comparative toner layer thickness regulation blade was incorporated in the same development unit as employed in Example 1.

Using the development unit thus obtained, the same charge injection performance test as in Example 1 was carried out. The results are given in Table 2.

COMPARATIVE EXAMPLE 3

The procedure for preparation of the toner layer thickness regulation blade employed in Example 1 was repeated except that the fluorosilicone polymer in Example 1 was not used, and that the amount of the polydimethylsiloxane was changed from 100 parts by weight to 300 parts by weight, so that a comparative toner layer thickness regulation blade No. 3 as shown in FIG. 1 was prepared.

The thus prepared comparative toner layer thickness regulation blade was incorporated in the same development unit as employed in Example 1.

Using the development unit thus obtained, the same charge injection performance test as in Example 1 was carried out. The results are given in Table 2.

TABLE 2

|  | Charge Quantity of Toner (μC/g) | | | | Adhesion of Toner to Blade |
|---|---|---|---|---|---|
|  | (I) | (II) | (III) | (IV) | (Grade) |
| Ex. 1 | +8 | −12 | −16 | +15 | 1 |
| Ex. 2 | +11 | −9 | −13 | +14 | 1 |
| Comp. Ex. 1 | +9 | −13 | −16 | +15 | 3 |
| Comp. Ex. 2 | +10 | −9 | −9 | +10 | 2 |
| Comp. Ex. 3 | +8 | −10 | −10 | +8 | 1 |

In the above Table 2, as previously noted, the positively-chargeable toner (a) was used in the cases of (I) and (IV). The negatively-chargeable toner (b) was used in the cases of (II) and (III).

As can be seen from the results in Table 2, when the toner layer thickness regulation member for use in the present invention is employed, the charge quantity of the toner can easily be controlled by changing the voltage applied to the triboelectric charging members. In addition to the above, toner particles do not adhere to the surface of the toner layer thickness regulation member. Moreover, the environmental resistance of the toner layer thickness regulation member for use in the present invention is excellent.

What is claimed is:

1. In a development unit comprising a development roller for developing a latent electrostatic image formed on an electrophotographic photoconductor to a visible toner image by applying a non-magnetic one-component type toner thereto, and a toner layer thickness regulation member for forming a toner layer on said development roller, an improvement wherein said toner layer thickness regulation member comprises at least (a) a fluorosilicone polymer including repeat units of formula (I), (b) a silicone polymer comprising a copolymer of dimethyl silicone and methyl vinyl silicone with a crosslinking density of $4 \times 10^{-4}$ to $8 \times 10^{-4}$ mol/cc, and (c) an alkylene-oxide-addition type fluorine-containing surface active agent:

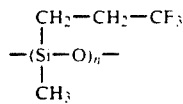

(I)

wherein n is an integer of 1,000 to 600,000.

2. The development unit as claimed in claim 1, wherein n in formula (I) of said fluoro silicone polymer is an integer of 10,000 to 500,000.

3. The development unit as claimed in claim 1, wherein n in formula (I) of said fluoro silicone polymer is an integer of 100,000 to 500,000.

4. The development unit as claimed in claim 1, wherein said alkylene-oxide-addition type fluorine-containing surface active agent is in an amount of 0.1 to 10 parts by weight to 100 parts by weight of said fluorosilicone polymer.

5. The development unit as claimed in claim 1, wherein said silicone polymer comprising said copolymer of dimethyl silicone and methyl vinyl silicone is in an amount of 10 to 1,000 parts by weight to 100 parts by weight of said fluorosilicone polymer.

6. The development unit as claimed in claim 1 wherein said fluorosilicone polymer including repeat units of formula (I): said silicone polymer comprising a copolymer of dimethyl silicone and methyl vinyl silicone: said alkylene-oxide-addition type fluorine-containing surface active agent are present in a parts-by-weight ratio in the range of 100:10 to 1,000:0.1 to 10.

7. The development unit as claimed in claim 1, wherein said alkylene-oxide-addition type fluorine-containing surface active agent includes a moiety of ethylene oxide as said alkylene oxide thereof.

8. The development unit as claimed in claim 1, wherein said alkylene-oxide-addition type fluorine-containing surface active agent includes a moiety of ethylene oxide as repeat units ranging from 3 to 15 as said alkylene oxide thereof.

9. The development unit as claimed in claim 1, wherein said alkylene-oxide addition type fluorine-containing surface active agent is selected from the group consisting of nonionic, anionic, cationic and amphoteric surface active agents.

10. The development unit as claimed in claim 1, wherein said toner layer thickness regulation member further comprises an inorganic filler.

11. The development unit as claimed in claim 10, wherein said inorganic filler is selected from the group consisting of dry silica, wet silica, diatomaceous earth, ground quartz, titanium oxide and talc.

12. The development unit as claimed in claim 1, wherein said toner layer thickness regulation member is supported by an electroconductive holder.

13. The development unit as claimed in claim 1, wherein said toner layer thickness regulation member is a blade.

14. The development unit as claimed in claim 1, wherein said toner layer thickness regulation member is a roller.

* * * * *